United States Patent
Furuya

(10) Patent No.: US 10,719,965 B2
(45) Date of Patent: Jul. 21, 2020

(54) IMAGE COMBINATION APPARATUS, IMAGE COMBINATION METHOD, AND IMAGE COMBINATION PROGRAM

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 132 days.

(21) Appl. No.: 16/130,299

(22) Filed: Sep. 13, 2018

(65) Prior Publication Data
US 2019/0012820 A1    Jan. 10, 2019

Related U.S. Application Data

(63) Continuation of application No. PCT/JP2017/007092, filed on Feb. 24, 2017.

(30) Foreign Application Priority Data

Apr. 25, 2016  (JP) ................................. 2016-087109

(51) Int. Cl.
| | |
|---|---|
| G06T 11/60 | (2006.01) |
| H04N 1/387 | (2006.01) |
| H04N 1/00 | (2006.01) |
| G06F 40/186 | (2020.01) |

(52) U.S. Cl.
CPC ............ *G06T 11/60* (2013.01); *G06F 40/186* (2020.01); *H04N 1/00196* (2013.01); *H04N 1/387* (2013.01)

(58) Field of Classification Search
CPC .......... G06T 11/60; G06F 40/186; G06F 9/00; G06F 3/14; H04N 1/00196; H04N 1/387
See application file for complete search history.

(56) References Cited

U.S. PATENT DOCUMENTS

| | | | |
|---|---|---|---|
| 2006/0200758 A1* | 9/2006 | Atkins | ..................... G06T 11/60 715/209 |
| 2011/0285748 A1* | 11/2011 | Slatter | ..................... G06T 11/60 345/629 |
| 2014/0079322 A1 | 3/2014 | Yamaji et al. | |
| 2015/0062653 A1 | 3/2015 | Kato et al. | |
| 2015/0189107 A1 | 7/2015 | Murata et al. | |

FOREIGN PATENT DOCUMENTS

| | | |
|---|---|---|
| JP | 2007-128148 A | 5/2007 |
| JP | 2013-046188 A | 3/2013 |
| JP | 2014-075778 A | 4/2014 |
| JP | 2015-053543 A | 3/2015 |
| WO | 2014/034266 A1 | 3/2014 |

OTHER PUBLICATIONS

International Search Report issued in PCT/JP2017/007092; dated Mar. 28, 2017.
International Preliminary Report on Patentability and Written Opinion ssued in PCT/JP2017/007092; dated Oct. 30, 2018.

* cited by examiner

*Primary Examiner* — Leon Viet Q Nguyen
(74) *Attorney, Agent, or Firm* — Studebaker & Brackett PC

(57) ABSTRACT

An image selection unit selects images for each group. An image arrangement unit lays out the images in a template. A layout evaluation value calculation unit calculates a layout evaluation value of each page for an image after the images are arranged in the template. A layout evaluation value period setting unit sets regular variability of the layout evaluation value of each page of the composite image.

20 Claims, 6 Drawing Sheets

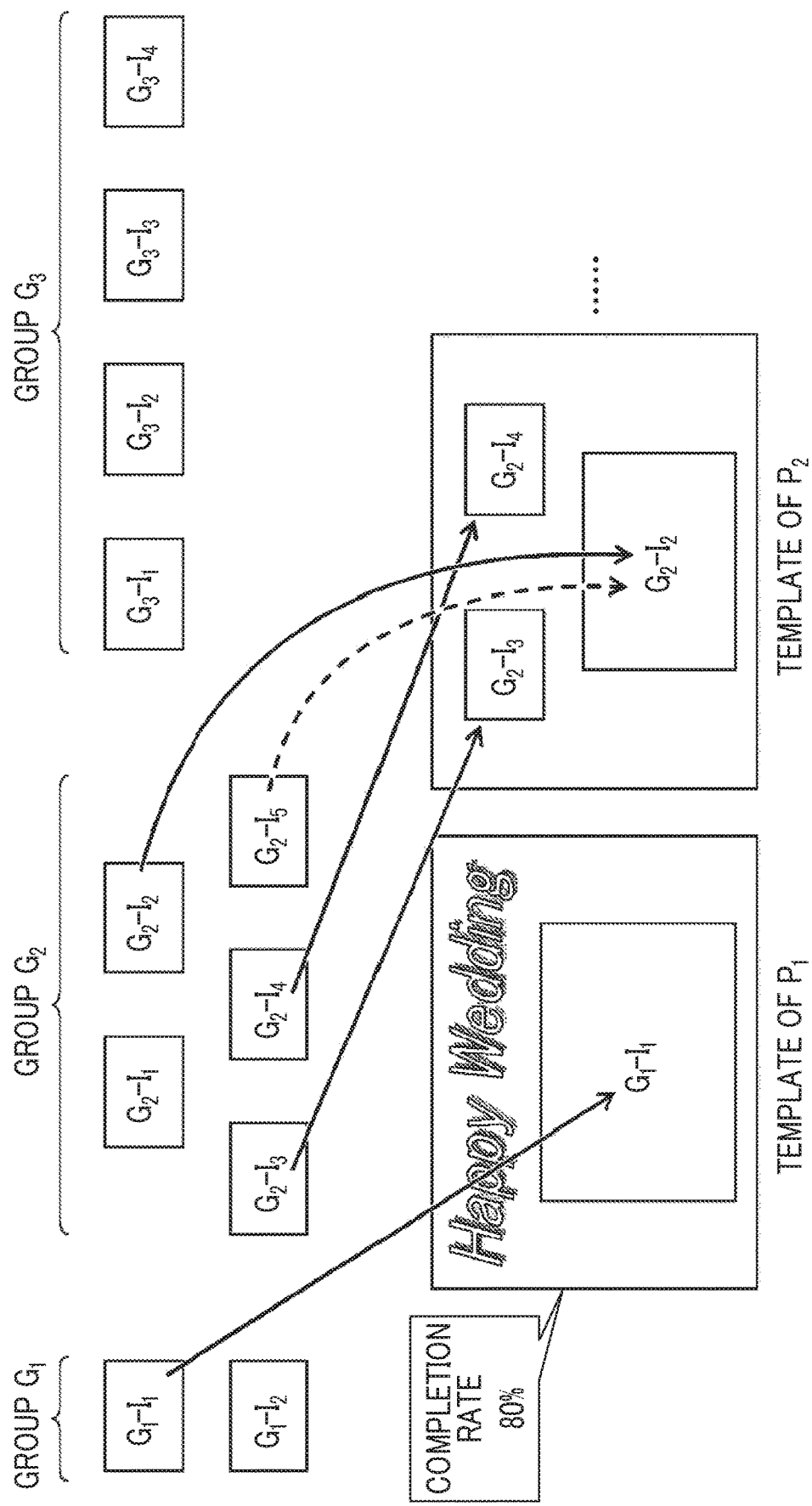

IMAGE COMBINATION APPARATUS, IMAGE COMBINATION METHOD, AND IMAGE COMBINATION PROGRAM

CROSS-REFERENCE TO RELATED APPLICATIONS

This application is a Continuation of PCT International Application No. PCT/JP2017/007092 filed on Feb. 24, 2017, which claims priority under 35 U.S.C § 119(a) to Japanese Patent Application No. 2016-087109 filed on Apr. 25, 2016. Each of the above application(s) is hereby expressly incorporated by reference, in its entirety, into the present application.

BACKGROUND OF THE INVENTION

1. Field of the Invention

The present invention relates to an image combination apparatus, an image combination method, and an image combination program and more particularly, to an image combination apparatus, an image combination method, and an image combination program that create a composite image based on a plurality of images.

2. Description of the Related Art

JP2015-053543A discloses evaluation means for calculating a layout evaluation value of each page and decision means for deciding a presentation order different from the order of the evaluation values on the basis of the calculated layout evaluation value of each page.

In JP2015-053543A, a large number of temporary layouts generated by repeating a process of randomly applying an input image to an image arrangement frame of the acquired template are quantitatively evaluated. This method determines the state of the image, such as brightness, chroma, or the amount of blurring, and the state is scored as the amount of evaluation. The amount of evaluation is classified into three evaluation items, that is, the evaluation of an individual image, the evaluation of the degree of fitness between an image and a slot (image arrangement frame), and the evaluation of balance in a layout page. In the evaluation of the individual image, the state of the image, such as brightness, chroma, or the amount of blurring, is determined and is then scored. Examples of the evaluation of the degree of fitness include character fitness and the determination of a lack of trimming. Examples of the evaluation value for evaluating balance image include similarity, a variation in the distribution of pixel values, and an object variation.

Further, the order in which layout candidates are presented to the user may be different from the order of the evaluation values, that is, the presentation order and the order of the scores of the evaluation values may not be completely matched or may be partially matched. The presentation order may be at least partially matched with the order of the evaluation values. For example, the layout candidates are matched with the layout candidates with the first to third highest scores, the layout candidate with the sixth highest score, the layout candidate with the eighth highest score, . . . . A plurality of evaluation values are integrated into a layout evaluation value for each temporary layout. A layout list is created using a layout evaluation order and random numbers, which makes it possible to easily provide layouts with different variations at a low cost.

JP2007-128148A discloses a technique which periodically and sequentially selects a plurality of combinations of options related to three items, that is, a layout, a background image, and an image effect one by one and applies the selected combination to each page. In addition, JP2007-128148A discloses a technique which randomly selects one combination from the plurality of combinations of the options related to three items and applies the selected combination to each page.

JP2014-075778A discloses a technique which classifies a plurality of images into a plurality of groups, decides the evaluation value of each image on the basis of the analysis result of the image, selects an image on the basis of the evaluation value or the information of the user's operation, and arranges the image in a predetermined layout.

SUMMARY OF THE INVENTION

In JP2015-053543A, the presentation order different from the order of the layout evaluation values is decided. The layout evaluation value indicates the comprehensive evaluation of the entire photo book and does not indicate the evaluation of each page of the photo book. Therefore, any page of any layout is likely to form a monotonous photo book with the same design.

JP2007-128148A is achieved by simply arranging the elements (a layout, a background images, and an image effect) of the ordered images periodically. Therefore, a monotonous photo book including pages with the same design is likely to be created.

In JP2014-075778A, the design of the entire laid-out composite image (a photo book) is not considered. In addition, since the image is laid out on the basis of the analysis result of the original image, the images are not laid out considering the finished state of the composite image and an impression and an atmosphere are not balanced in the composite image.

As such, in a case in which the image is selected and automatically laid out by the methods described in the prior art documents, monotonous images are likely to be arranged. However, solutions to the above-mentioned problems have not been known.

The invention has been made in view of the above-mentioned problems and an object of the invention is to automatically generate a composite image that is designed such that each page in which images are arranged has cadence in terms of design. In order to solve the problems, according to a first aspect of the invention, there is provided an image combination apparatus comprising: a grouping unit that groups a plurality of images such that each group of related images is associated with each of a plurality of pages; a template selection unit that selects an image arrangement template for each of the plurality of pages; an image selection unit that selects one or more images from the images in each group of the images which are grouped so as to be associated with each of the plurality of pages; a composite image generation unit that lays out the images, which are selected for each group corresponding to each of the plurality of pages by the image selection unit, according to the image arrangement template corresponding to each of the plurality of pages selected by the template selection unit to generate a composite image for each page; an evaluation value calculation unit that calculates a layout evaluation value of the composite image of each page generated by the composite image generation unit for each page; and a control unit that controls at least one of the selection of the image arrangement template by the template selection unit or the selection of the image by the image selection unit such that the layout evaluation value of each page calculated by the evaluation value calculation unit has regular variability with a progress of the page.

According to this aspect, since the layout evaluation value of each page has regular variability with the progress of the page, it is possible to give a viewer a cadent and lively impression or atmosphere. Here, the layout evaluation value of each page having regular variability with the progress of the page means that the layout evaluation value of each page varies with the progress of the page and the variation can be expressed by a mathematical rule. Examples of the mathematical rule include functions and numerical sequences.

According to a second aspect of the invention, the image combination apparatus further comprises a range setting unit that sets a range defining the regular variability of the layout evaluation value with the progress of the page. The control unit controls the image selection unit such that the images in the groups of the images are reselected, controls the evaluation value calculation unit such that the layout evaluation value of each page after the reselection is calculated, and performs a control process of repeating the reselection of the image and the calculation of the layout evaluation value of each page after the reselection until the layout evaluation value of each page after the reselection falls within the range set by the range setting unit.

According to a third aspect of the invention, in the image combination apparatus, the layout evaluation value of each page is calculated on the basis of at least one of an area ratio of the images laid out in the image arrangement template of each page, the number of the images laid out in the image arrangement template, a facial expression of a main object of the images laid out in the image arrangement template, a size of the main object of the images laid out in the image arrangement template, a color distribution of the images laid out in the image arrangement template, or a color distribution of the composite image.

According to this aspect, the layout evaluation value of each page calculated on the basis of at least one of the area ratio of the images laid out in the image arrangement template of each page, the number of images, the facial expression of the main object of the images, the size of the main object of the images, the color distribution of the images, or the color distribution of the composite image has regular variability with the progress of the page.

According to a fourth aspect of the invention, in the image combination apparatus, the layout evaluation value related to the facial expression of the main object is calculated on the basis of a smile level of the main object.

According to this aspect, the layout evaluation value of each page calculated on the basis of the smile level of the main object has regular variability with the progress of the page.

According to a fifth aspect of the invention, in the image combination apparatus, the control unit determines whether the layout evaluation value of each page has the regular variability on the basis of a rate of change in the layout evaluation value of each page and controls at least one of the selection of the image arrangement template by the template selection unit or the selection of the image by the image selection unit on the basis of a determination result.

According to a sixth aspect of the invention, the image combination apparatus further comprises a theme setting unit that sets a theme of the composite image. The control unit controls at least one of the selection of the image arrangement template by the template selection unit or the selection of the image by the image selection unit such that the regular variability of the layout evaluation value of each page has a pattern which is associated with the set theme in advance.

According to this aspect, the layout evaluation value of each page has the regular variability according to the progress of the page and the set theme.

According to a seventh aspect of the invention, the image combination apparatus further comprises a theme estimation unit that estimates a theme of the composite image. The control unit controls at least one of the selection of the image arrangement template by the template selection unit or the selection of the image by the image selection unit such that the regular variability of the layout evaluation value of each page has a pattern which is associated with the estimated theme in advance.

According to this aspect, the layout evaluation value of each page has the regular variability according to the progress of the page and the estimated theme.

According to an eighth aspect of the invention, in the image combination apparatus, the theme estimation unit analyzes an object of the image to estimate the theme of the composite image.

According to a ninth aspect of the invention, in the image combination apparatus, the regular variability includes a periodic variation in the layout evaluation value of each page based on a color distribution of each page of the composite image in a color image scale.

According to a tenth aspect of the invention, in the image combination apparatus, the control unit corrects the selected image such that the layout evaluation value of each page has the regular variability with the progress of the page.

According to an eleventh aspect of the invention, in the image combination apparatus, the control unit corrects at least one of a change in brightness, color, and size of the selected image, gradation of the selected image, or whitening and blackening of the selected image.

According to a twelfth aspect of the invention, the image combination apparatus further comprises: a completion rate calculation unit that calculates a completion rate of the composite image on the basis of the layout evaluation value of each page; and a completion rate output unit that outputs the completion rate.

According to this aspect, it is possible to show a user the result of controlling at least one of the selection of the image arrangement template by the template selection unit or the selection of the image by the image selection unit such that the layout evaluation value of each page calculated by the evaluation value calculation unit has regular variability with the progress of the image, as the completion rate.

According to a thirteenth aspect of the invention, in the image combination apparatus, the image arrangement template includes an image arrangement template of a photo book.

According to a fourteenth aspect of the invention, there is provided an image combination method comprising: a step of grouping a plurality of images such that each group of related images is associated with each of a plurality of pages; a step of selecting an image arrangement template for each of the plurality of pages; a step of selecting one or more images from the images in each group of the images which are grouped so as to be associated with each of the plurality of pages; a step of laying out the images, which are selected for each group corresponding to each of the plurality of pages, according to the image arrangement template corresponding to each of the plurality of selected pages to generate a composite image for each page; a step of calculating a layout evaluation value of the composite image generated for each page for each page; and a step of controlling at least one of the selection of the image arrangement template or the selection of the image such that the calculated layout evaluation value of each page has regular variability with a progress of the page.

An image combination program causing a computer to perform the image combination method is also included in the aspects of the invention. The image combination program is recorded in various non-transitory computer-readable tangible media and is then provided.

According to the invention, since the layout evaluation value of each page has regular variability with the progress of the page, it is possible to give a viewer a cadent and lively impression or atmosphere.

BRIEF DESCRIPTION OF THE DRAWINGS

FIG. 6 is a diagram illustrating an example of the reselection of each material image belonging to each group and a composite image obtained by laying out each selected material image in a template.

DESCRIPTION OF THE PREFERRED EMBODIMENTS

Figure 1:
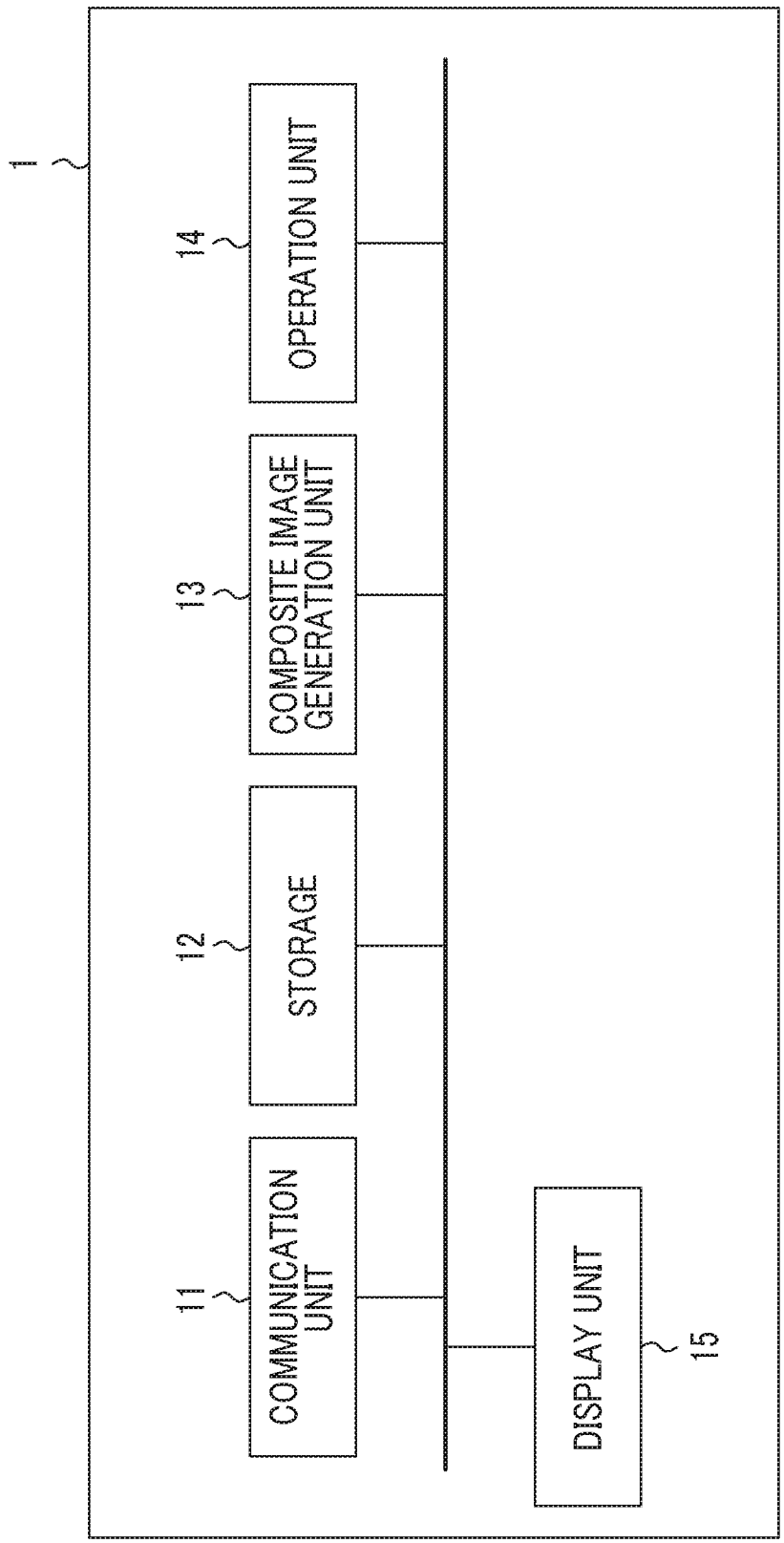
FIG. 1 is a block diagram illustrating the configuration of an image combination apparatus.

FIG. 1 is a block diagram illustrating the configuration of an image combination apparatus 1 according to an embodiment of the invention. The image combination apparatus 1 illustrated in FIG. 1 is an apparatus that automatically creates a composite image, such as a photo book or a collage print, using images uploaded to a server by a user or images read from, for example, a portable medium in which images have been arbitrarily stored by the user.

The composite image is sold as a commercial material, such as a real photo book or a real collage print created on the basis of images. The composite image is not limited to a charged product and includes products that are provided free.

The image combination apparatus 1 comprises a communication unit 11, a storage 12, a composite image generation unit 13, an operation unit 14, and a display unit 15. The image combination apparatus 1 can include a known personal computer or server and peripherals thereof.

The image combination apparatus 1 stores the image uploaded from a user terminal, such as a personal computer, a smart phone, a tablet terminal, through the communication unit 11 in the storage 12 or provides the image stored in the storage 12 or a composite image, such as a photo book or a collage print, created by the composite image generation unit 13 to the user terminal through the communication unit 11.

The storage 12 is a high-capacity storage medium, such as a hard disk unit, and can store a plurality of images in various image storage formats including as an album format (folder format), such as an online album, a storage format by date, and other storage formats.

The composite image generation unit 13 is a central processing unit (CPU), creates a composite image, such as a photo book or a collage print, using the images stored in the storage 12, and stores the composite image in the storage 12.

The operation unit 14 includes a touch panel and keys and receives various operations, such as the specifications of an album, from the user.

The display unit 15 displays, for example, the images or composite image templates stored in the storage 12, a template or an image selected from the displayed images by the operation unit 14, and the composite image created by the composite image generation unit 13.

Figure 2:
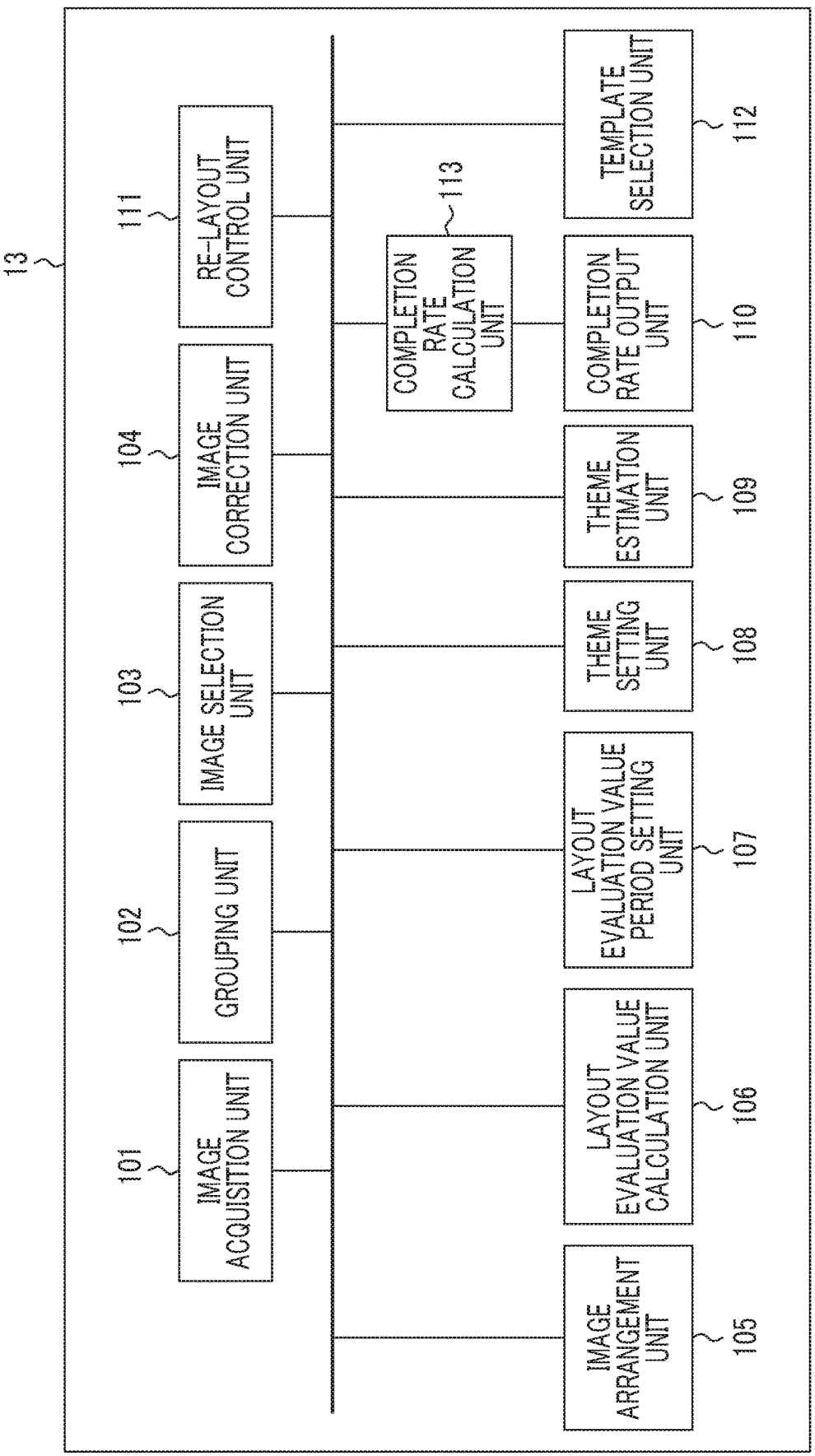
FIG. 2 is a block diagram illustrating the detailed functions of a composite image generation unit.

FIG. 2 is a block diagram illustrating the detailed functions of the composite image generation unit 13. These functions are implemented by the execution of a program stored in a non-transitory computer-readable tangible medium, such as the storage 12, by the composite image generation unit 13.

An image acquisition unit 101 acquires a plurality of material images which are materials for a photo book from the storage 12.

The grouping unit 102 groups the material images on the basis of the accessory information (for example, an Exif tag) of the material images. For example, in a case in which the imaging date and time is recorded as the accessory information, the grouping unit 102 classifies the plurality of acquired material images into a plurality of groups between the material images captured at a relatively long interval. The grouping includes the ordering of the groups and the association between the groups and pages according to the order.

Specifically, for example, the grouping unit 102 classifies a plurality of material images into a group corresponding to a period from 10:00 to 10:29 February 23, a group corresponding to a period from 10:30 to 10:59 February 23, . . . on the basis of the imaging date and time and orders the groups in reverse chronological order of the imaging date and time such that the groups are arranged in the order of a group corresponding to the first page of the template, a group corresponding to the second page of the template, . . . . . Alternatively, the grouping unit 102 may group the material images such that the material images having the same positional information included in the accessory information form a group or the material images close to the positional information form a group. In addition, the grouping unit 102 may group the images using accessory information other than the imaging date and time or the imaging position, for example, a title, an event name, a creator, a comment, or combinations thereof.

A theme setting unit 108 is means for setting the theme of a composite image such as a photo book. For example, the theme setting unit 108 sets a theme that has been arbitrarily selected from the prescribed themes "wedding", "travel", and "growth record" by the operation unit 14 to the theme of the composite image.

A theme estimation unit 109 analyzes the material images to estimate the theme of the composite image. The theme estimation unit 109 estimates the theme of the material image to be, for example, "wedding", "travel", or "growth record" on the basis of the facial expression and age of a person who is an object and the color arrangement or color distribution of the clothes or belongings of the person.

In a case in which the theme estimation unit 109 is not capable of estimating the theme or in case in which the theme estimation unit 109 is capable of estimating the theme and the theme is not appropriate, the theme setting unit 108 may receive the theme set by the user's operation. In addition, a plurality of themes may be set to one composite image. For example, a theme "wedding" may be set to the first half page of the composite image and a theme "wedding reception" may be set to the second half page of the composite image.

A template selection unit 112 selects a composite image template (image arrangement template) corresponding to the set or estimated theme of the composite image from the storage 12. The template includes the type of commercial material, such as a photo book or a collage print, the information of the position and size of a frame which is a material image arrangement area in each page, and the design information of the design of the frame or a background image outside the frame. The page includes a spread page and each page other than the spread page. The image arrangement template includes an image arrangement template of a photo book.

An image selection unit 103 reads the template selected by the template selection unit 112 from the storage 12 and selects the material images to be arranged in the frame of the image of each page prescribed by the read template for each page.

For example, in a case in which the maximum number of images that can be arranged on one page of the photo book with the theme "wedding" is 8 and the number of images grouped in correspondence with the page is 8, the image selection unit 103 selects all of the images. In a case in which the number of images that can be arranged on one page of the photo book with the theme "wedding" is 8 and the number of images grouped is 1 to 7, the image selection unit 103 selects all of the images and selects the material image required for satisfying the number of images arranged from another group that is temporally adjacent to the group.

An image correction unit 104 corrects the brightness or color of the material image selected by the image selection unit 103 so as to be suitable for the design information of an arrangement destination page in the template selected by the template selection unit 112. This is correction for unifying the brightness or color of the material image with the background image of the page of the template in which the material image is to be arranged. The image correction unit 104 may blacken or whiten the material image or may change the gradation or size of the material image such that the material image is suitable for the design information of the template.

An image arrangement unit 105 arranges the material image corrected by the image correction unit 104 in the frame of the image of each page prescribed by the template and combines the material image with the template to create a composite image.

A layout evaluation value calculation unit 106 calculates a layout evaluation value for each page of the composite image in which the material image is arranged in the template of the corresponding page of the photo book.

The layout evaluation value is calculated on the basis of at least one of the total number of images arranged in one page, the ratio of the area of all of the images arranged in one page to the area of a portion other than the images, the facial expression of a main object in all of the images arranged in one page, the size of the main object, or the color distribution of a composite image of all of the images arranged in one page and the template. The user may define the layout evaluation value in any method. It is assumed that the layout evaluation value defined once is not changed and is consistent until the creation of the composite image is completed.

For example, in a case in which the sum of the areas of all of the images arranged in one page is S1 and the area of the background image other than the images in one page is S2, the layout evaluation value is S1/S2. The area ratio may be used as the layout evaluation value or the balance between the area of the images and the area of the background image may be used as the layout evaluation value by the comparison between the area and a threshold value. For example, the layout evaluation value may be 1 in a case in which 0.5<S1/S2<0.8 is satisfied and may be 0 in the other cases. Therefore, the layout evaluation value is reduced in a case in which the ratio of the area of the background image is extremely high or in a case in which the ratio of the area of the arranged images is extremely high.

The layout evaluation value related to the facial expression of the main object in all of the images arranged in one page is calculated by the sum of the smile levels indicating the degree of smile of each object. The smile level can be calculated for a face region by a known method. Specifically, feature amounts required to calculate the smile level, such as the contour of face components including the eyes, the nose, and the mouth forming the face and the positions of the face components including the positions of the corner of the eye, the tail of the eye, nostrils, the corner of the mouth, and lips, are calculated by, for example, template matching or machine learning. The feature amounts are analyzed to calculate the smile level. The smile level may be calculated by other known methods.

The size of the face detected by face detection can be used as the size of the main object. The size of the face may be used as the layout evaluation value or the balance of the size of the face with respect to the area of the image may be used as the layout evaluation value.

The color distribution of the composite image of all images and the template may be a color distribution obtained by drawing the distribution of numerical values related to the colors of each page of the composite image in a color space including two or more axes to which the numerical values related to the colors are projected. For example, the color distribution is obtained by plotting a color arrangement pattern including pixels of the composite image in a space related to colors such as an image scale having a horizontal axis of WARM and COOL and a vertical axis of SOFT and HARD developed by Nippon Color & Design Research Institute Inc.

The layout evaluation value related to the color distribution is calculated by a calculation method depending on the theme of the photo book set by the theme setting unit 108. For example, in a case in which the theme of the photo book is "wedding" and the color arrangement pattern of the composite image is plotted in an "elegant" zone of the image scale, the layout evaluation value is 1. In a case in which the color arrangement pattern of the composite image is plotted in the other zones, the layout evaluation value is 0.

In addition, for example, the number of faces (face regions) of persons included in the material image, the size of the face, the direction of the face, the position of the face may be detected and the layout evaluation value may be calculated on the basis of the number of faces included in the material image, the size of the face, and the number of faces facing the front. Alternatively, the layout evaluation value may be calculated on the basis of, for example, the brightness of the face region, the vividness of colors, the degree of under-exposure or over-exposure, and the degree of blurring.

Preferably, the layout evaluation value calculation unit 106 calculates a layout evaluation value corresponding to the theme set by the theme setting unit 108 or the theme of the composite image estimated by the theme estimation unit 109.

For example, it is assumed that the theme of the composite image is "travel". In a case in which the color arrangement pattern of one page with the composite image is plotted in a "clear" zone of the image scale, the layout evaluation value of the page is the minimum distance from the outer edge of the "clear" zone to the coordinates where the color arrangement pattern of the page is plotted. The layout evaluation value of the page is 0 in a case in which the color arrangement pattern of the page is plotted in zones other than the "clear" zone.

Alternatively, it is assumed that the theme of the composite image is "wedding". In a case in which the color arrangement pattern of one page with the composite image is plotted in the "elegant" zone of the image scale, the layout evaluation value of the page is the minimum distance from the outer edge of the "elegant" zone to the coordinates where the color arrangement pattern of the page is plotted. The layout evaluation value of the page is 0 in a case in which the color arrangement pattern of the page is plotted in zones other than the "elegant" zone.

A layout evaluation value period setting unit (range setting unit) 107 sets the periodic variability of the layout evaluation value of each page of the composite image.

Figure 3:
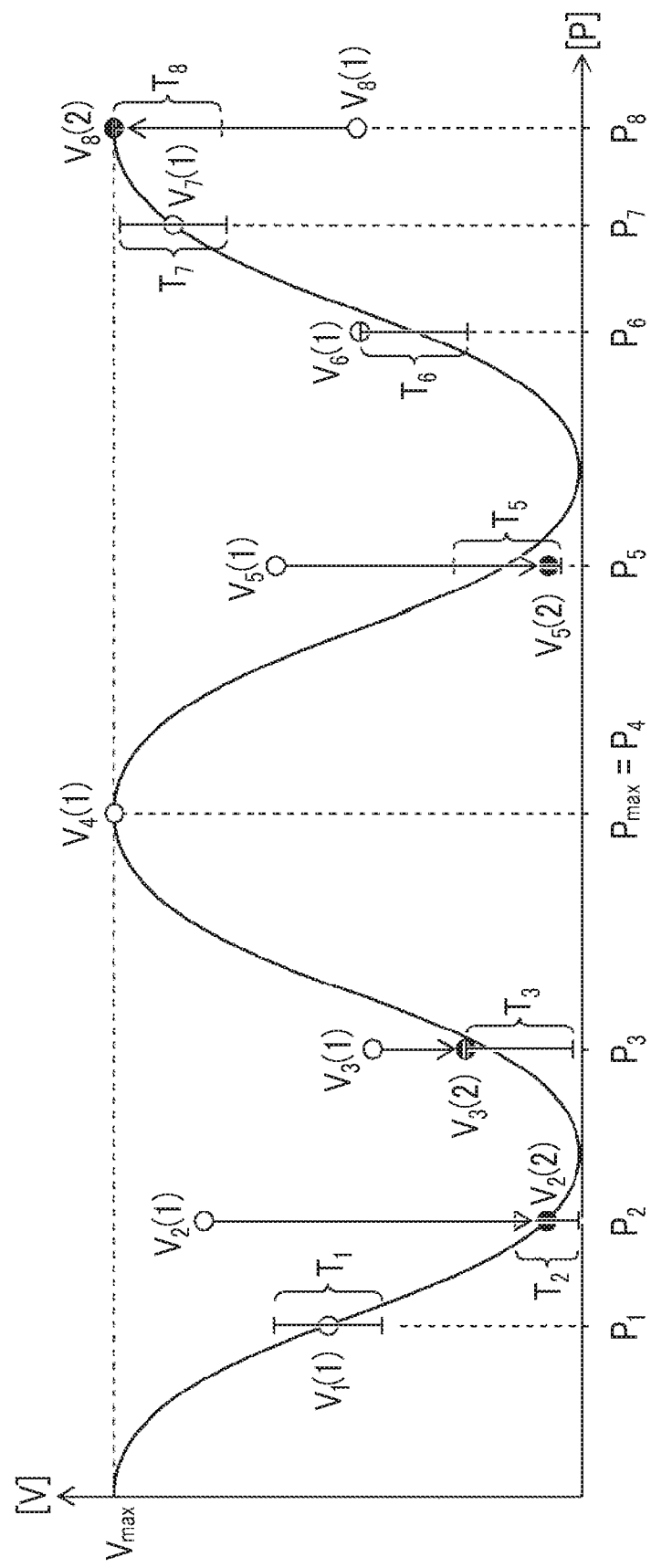
FIG. 3 is a diagram illustrating an example of a threshold range defining the regular variability of a layout evaluation value.

For example, as illustrated in FIG. 3, the layout evaluation value period setting unit 107 specifies a page Pmax having the maximum value Vmax among the layout evaluation values $V_1(1), V_2(1), \ldots$ of each page calculated by the layout evaluation value calculation unit 106. Then, the layout evaluation value period setting unit 107 sets the threshold ranges $T_1, T_2, \ldots$ of the layout evaluation value in which the layout evaluation values $V_1(1), V_2(1), \ldots$ of the pages $P_1, P_2, \ldots$ periodically increase and decrease from the layout evaluation value of the page Pmax with the maximum value Vmax with the progress of the page. The layout evaluation value may be a one-dimensional parameter or a two-dimensional or more parameter. The threshold range has a dimension corresponding to the layout evaluation value and may be a one-dimensional parameter or a two-dimensional or more parameter.

The periodic up-and-down movement of the threshold ranges $T_1, T_2, \ldots$ in FIG. 3 follow a cosine curve having Vmax as the upper limit of the amplitude. However, this is illustrative and the threshold range may be set according to a periodically varying function, such as a sine curve, a composite wave of a sine curve and a cosine curve with different phases or amplitudes, or a wavelet function. [0069] In addition, the threshold range of each page defining the regular variability may be a pattern that is associated with the theme of the composite image in advance. For example, in a case in which the theme is "travel", the threshold range may be set such that an amplitude A between the maximum value and the minimum value of the layout evaluation value is 1. In a case in which the theme is "wedding", the threshold range may be set such that the amplitude A between the maximum value and the minimum value of the layout evaluation value is 0.8.

A re-layout control unit (control unit) 111 controls the image selection unit 103, the image arrangement unit 105, and the layout evaluation value calculation unit 106 such that the material images arranged in each page are recombined and the layout evaluation values of each page after the recombination are within the threshold ranges $T_1, T_2, \ldots$ set by the layout evaluation value period setting unit 107.

That is, first, the re-layout control unit 111 compares the layout evaluation value of each page with the threshold range of each page. In a case in which the layout evaluation value of each page is not within the threshold range of each corresponding page, the re-layout control unit 111 determines that it is necessary to reselect the material image of the page (a variation in the layout evaluation value of each page is monotonous or random). In contrast, in a case in which the layout evaluation value of each page is within the threshold range of each corresponding page, the re-layout control unit 111 determines that it is not necessary to reselect the material image of the page (the variation in the layout evaluation value of each page is not monotonous and random, but is periodic).

In addition, the re-layout control unit 111 may determine whether the variation in the layout evaluation value of each page is monotonous or random, not from the comparison between the layout evaluation value of each page and the threshold range, but from the difference between the layout evaluation values of different pages or the rate of change in the difference.

In a case in which the absolute value of the difference between the layout evaluation values of a page A and a page B adjacent to the page A is within a predetermined threshold range, for example, equal to or greater than 1 and less than 2, the material image of the page A is not selected. In a case in which the absolute value of the difference between the layout evaluation values is out of the predetermined range, the material image of the page A is reselected.

In a case in which the rate of change between the layout evaluation values is 0 or near 0 for any page, it can be determined that the variation in the layout evaluation value is monotonous. In addition, in a case in which the rate of change in the difference between the layout evaluation values of the pages A and B is greater than a predetermined value and the rate of change in the difference between the layout evaluation values of the pages B and C is 0 or near 0, it can be determined that the variation in the layout evaluation value between the pages B and C is random.

For example, in a case in which the rate of change in the difference between the layout evaluation values is the same or approximate for any page, it can be determined that the variation in the layout evaluation value of each page is not monotonous and random, but is periodic.

Then, the re-layout control unit 111 controls the image selection unit 103 such that the material image contributing to increasing or decreasing the layout evaluation value is selected from a group of the pages in which the reselection of the material image is determined to be needed or a group other than the group in which the material image of the page has been selected, for example, a group that is temporally adjacent to the group. In a case in which an extra material image that can be additionally selected is present in the same group, the material image may be selected. In a case in which the extra material image is absent, the material image may be selected from other groups.

That is, the re-layout control unit 111 controls the image selection unit 103 such that, in a case in which the layout evaluation value of a page is less than the lower limit of the threshold range, any material image (for example, a material image that most contributes to decreasing the layout evaluation value since the color thereof is not matched with the background image of the selected template) is excluded from the group in which the material image of the page has been selected. Instead, a material image that more contributes to increasing the layout evaluation value than the excluded material image is additionally selected from a group corresponding to the page or another group, such as a group that is temporally adjacent to the group including the page, and is to be a material image arranged in the page whose layout evaluation value is less than the lower limit of the threshold range.

In addition, the re-layout control unit 111 controls the image selection unit 103 such that, in a case in which the layout evaluation value of a page is greater than the upper limit of the threshold range, any material image (for example, a material image that most contributes to increasing the layout evaluation value since the color thereof is matched with the background image of the selected template) is excluded from the group in which the material image of the page has been selected. Instead, a material image that more contributes to decreasing the layout evaluation value than the excluded material image is additionally selected from a group corresponding to the page or another group, such as a group that is temporally adjacent to the group including the page, and is to be a material image arranged in the page whose layout evaluation value is greater than the upper limit of the threshold range.

Then, after the image selection unit 103 reselects the material image, the re-layout control unit 111 controls the image arrangement unit 105 such that the re-layout of the selected material image and the additionally selected material image except the excluded material image in the template and the generation of a composite image are performed for the page. In addition, the re-layout control unit 111 controls the layout evaluation value calculation unit 106 such that, for the composite image after the re-layout of the material image in the template, the layout evaluation value of the page subjected to image reselection and re-layout is calculated again.

The re-layout control unit 111 compares the layout evaluation values $V_2(2), \ldots$ of the page after re-layout with the threshold ranges $T_2, T_3, \ldots$. In a case in which the layout evaluation values $V_2(2), V_3(2), \ldots$ are out of the threshold ranges $T_2, T_3, \ldots$, the re-layout control unit 111 repeats the reselection and rearrangement of the material image and the recalculation of the layout evaluation value in the same way as described above until the layout evaluation values $V_2(2), V_3(2), \ldots$ fall within the threshold ranges $T_2, T_3, \ldots$. In a case in which the layout evaluation values $V_1(1), V_2(1), \ldots$ or the layout evaluation values $V_1(2), V_2(2), \ldots$ are within the threshold ranges $T_1, T_2, \ldots$, the re-layout control unit 111 does not perform the reselection and rearrangement of the material image and the recalculation of the layout evaluation value any more.

In a case in which the layout evaluation value is greater than or less than the threshold range even though the material images are added from an adjacent group, the material images may be selected and added from other groups.

The re-layout control unit 111 may perform control such that the image correction unit 104 performs a change in the brightness, color, and size of the reselected material image, gradation, whitening and blackening, and combinations of some or all of them to make the layout evaluation value after the rearrangement of the reselected material image fall within the threshold range, in addition to or separately from the reselection of the material image.

In addition, a process which selects an unselected template, from which the layout evaluation value has not been calculated, from the templates corresponding to the set or estimated theme, in addition to or separately from the reselection of the material image, arranges the selected material image or the reselected material image in the template, and calculates the layout evaluation value may be repeatedly performed. For example, the area ratio of the frames of the template may correspond to the threshold range. In this case, a layout in which the area ratio of the material images varies regularly is obtained.

In FIG. 3, since the layout evaluation values $V_2(1), V_3(1), V_5(1),$ and $V_8(1)$ are out of the threshold ranges $T_2, T_3, T_5,$ and $T_8$, respectively, the material images are reselected and rearranged. Therefore, the layout evaluation values $V_2(1), V_3(1), V_5(1),$ and $V_8(1)$ are changed to the layout evaluation values $V_2(2), V_3(2), V_5(2),$ and $V_8(2)$ in the threshold ranges $T_2, T_3, T_5,$ and $T_8$, respectively, and the layout evaluation value V of each page is regularly changed with the progress of the page P.

The reselection of the material image may be performed on the basis of any user operation through the operation unit 14.

A completion rate output unit 110 displays the completion rate of the composite image before re-layout and the completion rate of the composite image after re-layout on the display unit 15. The completion rate is a numerical value that is determined on the basis of the layout evaluation value of the composite image. For example, the completion rate is the layout evaluation value of each page of the composite image before re-layout and the composite image after re-layout, the average value of the layout evaluation values of each page, the sum of the layout evaluation values of each page, or a numerical value that indicates the ratio of the ideal upper limit of the average value or sum of the layout evaluation values to the average value or sum of the actual layout evaluation values as a percentage and is calculated by a completion rate calculation unit 113.

The composite image before re-layout and the composite image after re-layout may be displayed on the display unit 15 in parallel to the output and presentation of the completion rate by the completion rate output unit 110.

Figure 4:
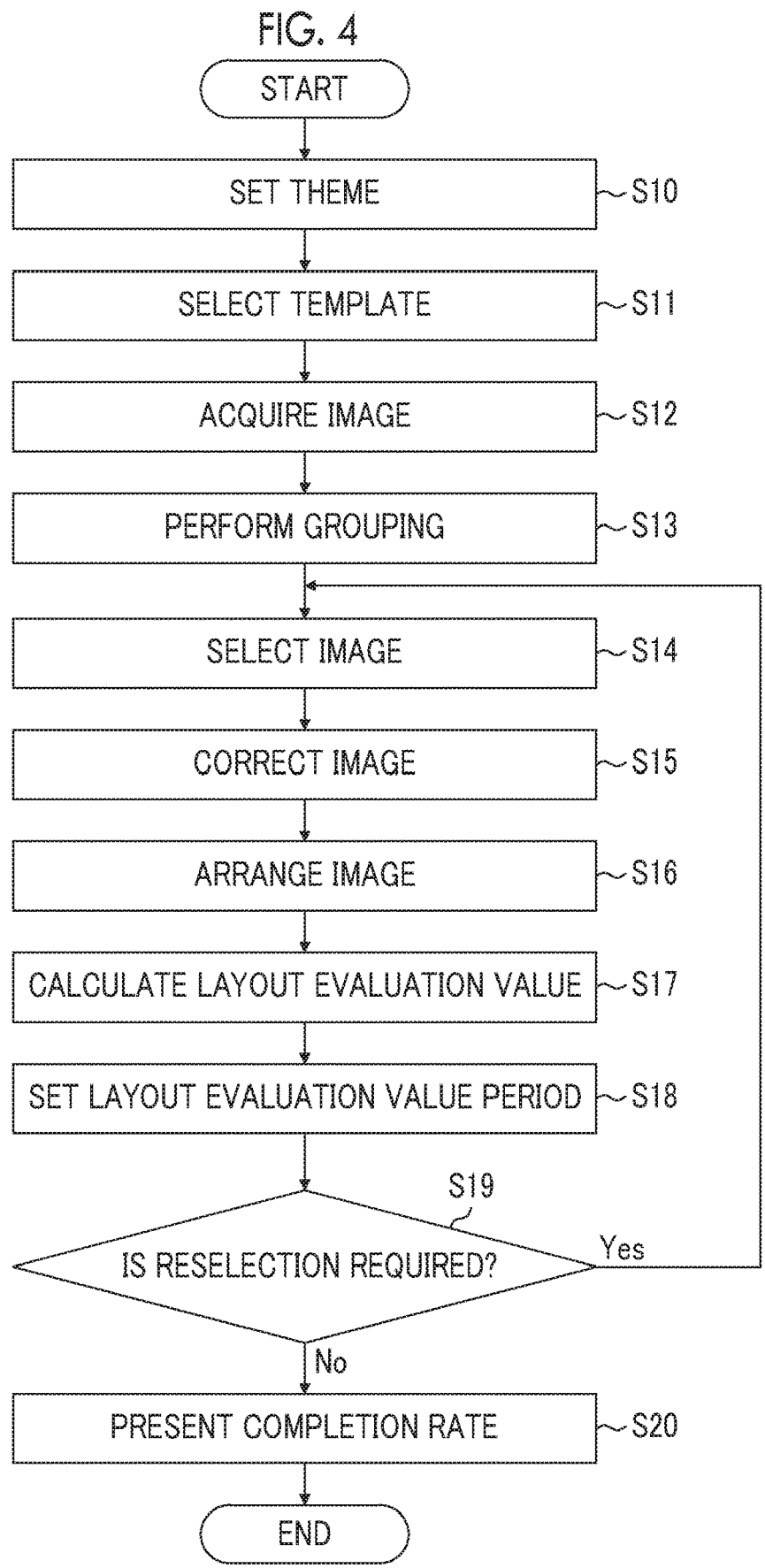
FIG. 4 is a flowchart illustrating an image combination process.

FIG. 4 is a flowchart illustrating an image combination process performed by the image combination apparatus 1. A program that causes the image combination apparatus 1 to perform the process is stored in a non-transitory computer-readable tangible medium such as the storage 12.

In S10 (theme setting step), the theme setting unit 108 sets the theme of the composite image. Instead of the theme setting step, a step (theme estimation step) in which the theme estimation unit 109 estimates the theme of the composite image may be performed.

In S11 (template selection step), the template selection unit 112 selects a template corresponding to the theme of the composite image set or estimated in S10 from the storage 12.

In S12 (image acquisition step), the image acquisition unit 101 acquires a plurality of material images which are materials for a photo book from the storage 12.

In S13 (grouping step), the grouping unit 102 groups the material images acquired by the image acquisition unit 101 into a plurality of groups on the basis of each accessory information item.

In S14 (image selection step), the image selection unit 103 selects the material images corresponding to the number of images that can be arranged on one page of the composite image from a plurality of material images in each group. In a case in which it is difficult to ensure the number of necessary images in a group, the material images are selected from adjacent groups.

In S15 (image correction step), the image correction unit 104 performs various types of correction, such as color adjustment, trimming, and resizing, for the selected material images.

In S16 (image arrangement step), the image arrangement unit 105 lays out the corrected material images in the template corresponding to the theme of the composite image set or estimated in S10 to generate the composite image.

In S17 (layout evaluation value calculation step), the layout evaluation value calculation unit 106 calculates the layout evaluation value of each page in the composite image after the material images are arranged in the template.

In S18 (layout evaluation value period setting step), the layout evaluation value period setting unit 107 sets the periodic variability of the layout evaluation value of each page of the composite image.

In S19 (reselection determination step), the re-layout control unit 111 determines whether the material image needs to be reselected for each page of the composite image. In a case in which it is determined that the material image needs to be reselected, the process returns to S14 and the reselection of the material image, the layout of the reselected material image, and the recalculation of the layout evaluation value are performed for the page in which the material image needs to be reselected. S15 may be repeated if necessary. S18 (layout evaluation value period setting step) may not be repeated. In addition, the correction of the material image and the selection of another template may be repeated.

In S20 (completion rate presentation step), the completion rate output unit 110 outputs the completion rate of the composite image to the display unit 15 and presents the completion rate. The completion rate presentation step may be repeated whenever S17 is performed.

Figure 5:
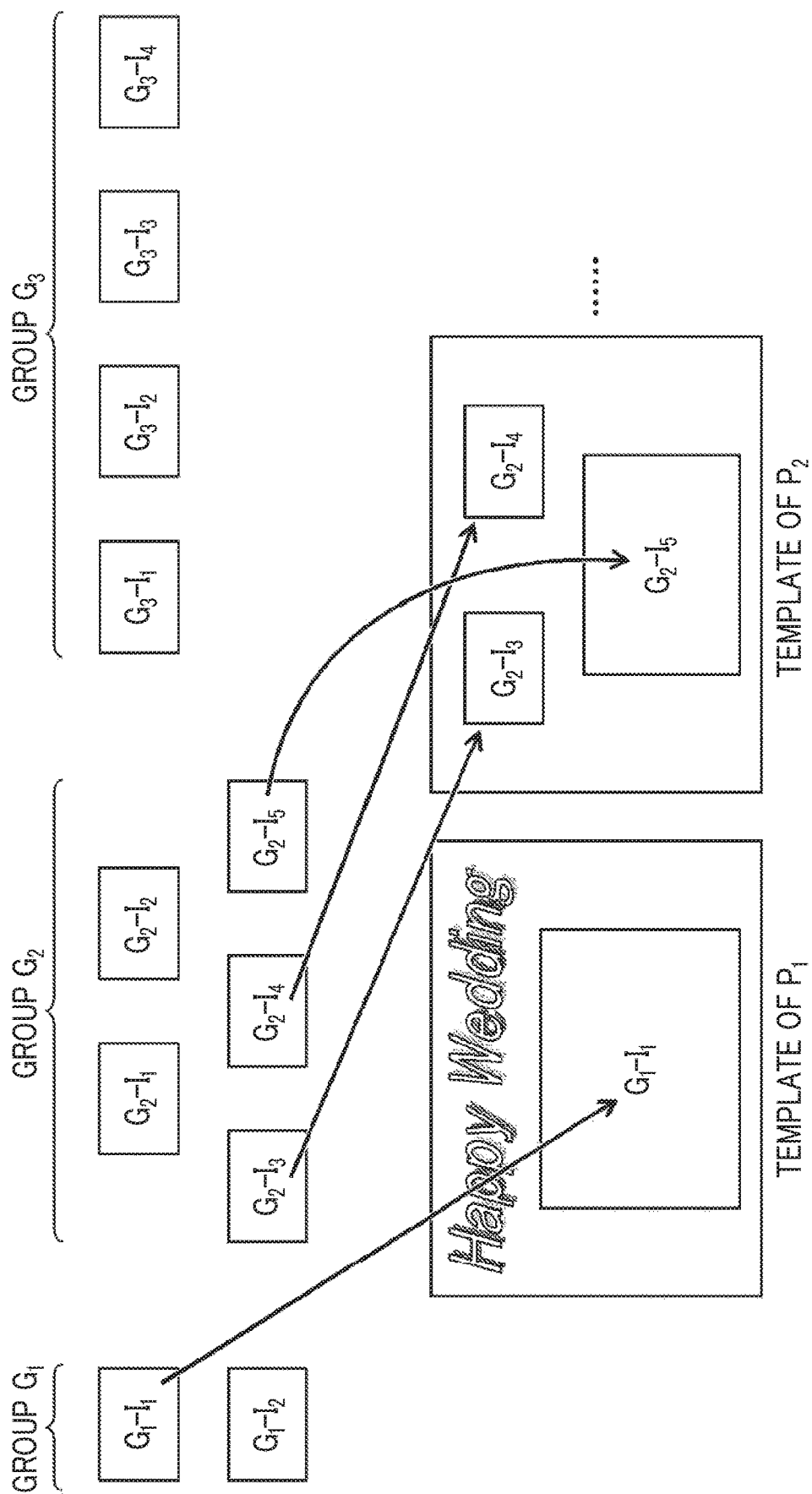
FIG. 5 is a diagram illustrating an example of the selection of each material image belonging to each group and a composite image obtained by laying out each selected material image in a template.

FIG. 5 illustrates a composite image obtained by selecting a material image $G_1$-$I_1$ among the material images classified into groups $G_1$, $G_2$, $G_3$, . . . from the group $G_1$, selecting material images $G_2$-$I_3$, $G_2$-$I_4$, and $G_2$-$I_5$ from the group $G_2$, and laying out the selected material images in the frames of the templates of the corresponding pages $P_1$, $P_2$, . . . . The layout evaluation values in a case in which the material images are laid out in the frames of the templates of the pages $P_1$, $P_2$, . . . are the above-mentioned $V_1(1)$, $V_2(1)$, . . . .

FIG. 6 illustrates a composite image obtained by selecting the material image $G_1$-$I_1$ among the material images classified into the groups $G_1$, $G_2$, $G_3$, . . . from the group $G_1$, selecting the material images $G_2$-$I_3$ and $G_2$-$I_4$ that has been selected and a material image $G_2$-$I_2$ that more contributes to the regular variation of the layout evaluation value than the selected material image $G_2$-$I_5$ from the group $G_2$, and laying out the material images in the frames of the templates of the corresponding pages $P_1$, $P_2$, . . . . The layout evaluation values in a case in which the reselected material images are laid out in the frames of the templates of the pages $P_1$, $P_2$, . . . are the above-mentioned $V_2(2)$, . . . .

As illustrated in FIG. 6, the completion rate output unit 110 may display the completion rate in a state in which the reselected material image is laid out.

In the composite image created by the above-mentioned process, the layout evaluation value varies regularly with the progress of the page. Therefore, it is possible to give a viewer an impression or an atmosphere that is not monotonous and is cadent and lively. That is, since the layout evaluation value of each page calculated on the basis of at least one of the area ratio of the images laid out in the image arrangement template of each page, the number of images, the facial expression of the main object of the images, the size of the main object of the images, the color distribution of the images, or the color distribution of the composite image has regular variability with the progress of the page, it is possible to give a viewer a cadent and lively impression or atmosphere. Moreover, since the layout evaluation value of each page calculated on the basis of the smile level of the main object has regular variability with the progress of the page, it is possible to give a viewer a cadent and lively impression or atmosphere. Further, since the layout evaluation value of each page has the regular variability according to the progress of the page and the set theme, it is possible to give a viewer a cadent and lively impression or atmosphere. Furthermore, since the layout evaluation value of each page has the regular variability according to the progress of the page and the estimated theme, it is possible to give a viewer a cadent and lively impression or atmosphere.

For example, in a case in which the theme is "wedding" and the layout evaluation value is calculated by the minimum distance from the outer edge of the "elegant" zone of the image scale, the material image or the template is reselected such that color arrangement in the "elegant" zone of the image scale is regularly changed. Therefore, it is possible to give a viewer a cadent and lively impression or atmosphere corresponding to the theme "wedding".

Alternatively, in a case in which the theme is "wedding" and the layout evaluation value is calculated by the smile level of an object, it is possible to give a viewer the situation in which the object changes periodically from a tense face to a smiling face with the progress of the page or vice versa in the composite image of "wedding" such that the person can be easily understood.

Furthermore, in a case in which the layout evaluation value is calculated on the basis of the area ratio of the images, the number of images, the size of the main object of the image, and the color distribution of the image, it is possible to give a viewer the situation in which these elements change periodically with the progress of the page.

EXPLANATION OF REFERENCES

1: image combination apparatus
11: communication unit
12: storage
13: composite image generation unit
14: operation unit
15: display unit
101: image acquisition unit
102: grouping unit
103: image selection unit
104: image correction unit
105: image arrangement unit
106: layout evaluation value calculation unit
107: layout evaluation value period setting unit
108: theme setting unit
109: theme estimation unit
110: completion rate output unit
111: re-layout control unit
112: template selection unit
S10: theme setting step
S11: template selection step
S12: image acquisition step
S13: grouping step
S14: image selection step
S15: image correction step
S16: image arrangement step
S17: layout evaluation value calculation step S18: layout evaluation value period setting step
S19: reselection determination step
S20: completion rate presentation step

What is claimed is:

1. An image combination apparatus comprising:
a processor configured to
  group a plurality of images such that each group of related images is associated with each of a plurality of pages;
  select an image arrangement template for each of the plurality of pages;
  select one or more images from the images in each group of the images which are grouped so as to be associated with each of the plurality of pages;
  lay out the images, which are selected for each group corresponding to each of the plurality of pages, according to the image arrangement template corresponding to each of the plurality of pages to generate a composite image for each page;
  calculate a layout evaluation value of the composite image of each page, for each page; and
  control at least one of the selection of the image arrangement template or the selection of the image such that the layout evaluation value of each page periodically varies with a progress of the page.

2. The image combination apparatus according to claim 1, wherein
the processor is further configured to
  set a range defining the periodic variation of the layout evaluation value with the progress of the page, and
  reselect the images in the groups of the images, calculate the layout evaluation value of each page after the reselection, and repeat the reselection of the image and the calculation of the layout evaluation value of each page after the reselection until the layout evaluation value of each page after the reselection falls within the range.

3. The image combination apparatus according to claim 1, wherein
the layout evaluation value of each page is calculated on the basis of at least one of an area ratio of the images laid out in the image arrangement template of each page, the number of the images laid out in the image arrangement template, a facial expression of a main object of the images laid out in the image arrangement template, a size of the main object of the images laid out in the image arrangement template, a color distribution of the images laid out in the image arrangement template, or a color distribution of the composite image.

4. The image combination apparatus according to claim 2, wherein
the layout evaluation value of each page is calculated on the basis of at least one of an area ratio of the images laid out in the image arrangement template of each page, the number of the images laid out in the image arrangement template, a facial expression of a main object of the images laid out in the image arrangement template, a size of the main object of the images laid out in the image arrangement template, a color distribution of the images laid out in the image arrangement template, or a color distribution of the composite image.

5. The image combination apparatus according to claim 3, wherein
the layout evaluation value related to the facial expression of the main object is calculated on the basis of a smile level of the main object.

6. The image combination apparatus according to claim 4, wherein
the layout evaluation value related to the facial expression of the main object is calculated on the basis of a smile level of the main object.

7. The image combination apparatus according to claim 1, wherein
the processor is further configured to determine whether the layout evaluation value of each page has the periodic variation on the basis of a rate of change in the layout evaluation value of each page and control at least one of the selection of the image arrangement template or the selection of the image on the basis of a determination result.

8. The image combination apparatus according to claim 2, wherein
the processor is further configured to determine whether the layout evaluation value of each page has the periodic variation on the basis of a rate of change in the layout evaluation value of each page and control at least one of the selection of the image arrangement template or the selection of the image on the basis of a determination result.

9. The image combination apparatus according to claim 3, wherein
the processor is further configured to determine whether the layout evaluation value of each page has the periodic variation on the basis of a rate of change in the layout evaluation value of each page and control at least one of the selection of the image arrangement template or the selection of the image on the basis of a determination result.

10. The image combination apparatus according to claim 4, wherein
the processor is further configured to determine whether the layout evaluation value of each page has the periodic variation on the basis of a rate of change in the layout evaluation value of each page and control at least one of the selection of the image arrangement template or the selection of the image on the basis of a determination result.

11. The image combination apparatus according to claim 1, wherein
the processor is further configured to
  set a theme of the composite image, and
  control at least one of the selection of the image arrangement template or the selection of the image such that the periodic variation of the layout evaluation value of each page has a pattern which is associated with the set theme in advance.

12. The image combination apparatus according to claim 1, wherein
the processor is further configured to
  estimate a theme of the composite image, and
  control at least one of the selection of the image arrangement template or the selection of the image such that the periodic variation of the layout evaluation value of each page has a pattern which is associated with the estimated theme in advance.

13. The image combination apparatus according to claim 12, wherein
the processor is further configured to analyze an object of the image to estimate the theme of the composite image.

14. The image combination apparatus according to claim 1, wherein
the periodic variation includes a periodic variation in the layout evaluation value of each page based on a color distribution obtained by drawing a distribution of numerical values related to colors of each page of the composite image in a color space including two or more axes to which the numerical values related to the colors are projected.

15. The image combination apparatus according to claim 1, wherein
the processor is further configured to correct the selected image such that the layout evaluation value of each page has the periodic variation with the progress of the page.

16. The image combination apparatus according to claim 15, wherein
the processor is further configured to correct at least one of a change in brightness, color, and size of the selected image, gradation of the selected image, or whitening and blackening of the selected image.

17. The image combination apparatus according to claim 1, wherein
the processor is further configured to
calculate a completion rate of the composite image on the basis of the layout evaluation value of each page; and
output the completion rate.

18. The image combination apparatus according to claim 1, wherein
the image arrangement template includes an image arrangement template of a photo book.

19. An image combination method using the image combination apparatus according to claim 1 comprising:
a step of grouping the plurality of images such that each group of related images is associated with each of the plurality of pages;
a step of selecting the image arrangement template for each of the plurality of pages;
a step of selecting one or more images from the images in each group of the images which are grouped so as to be associated with each of the plurality of pages;
a step of laying out the images, which are selected for each group corresponding to each of the plurality of pages, according to the image arrangement template corresponding to each of the plurality of selected pages to generate the composite image for each page;
a step of calculating the layout evaluation value of the composite image generated for each page for each page; and
a step of controlling at least one of the selection of the image arrangement template or the selection of the image such that the calculated layout evaluation value of each page periodically varies with the progress of the page.

20. A non-transitory computer readable recording medium storing an image combination program causing a computer to perform the image combination method according to claim 19.

* * * * *